April 28, 1942. V. W. KLIESRATH ET AL 2,281,159
TRANSMISSION OPERATING MECHANISM
Filed Oct. 24, 1939 4 Sheets-Sheet 1
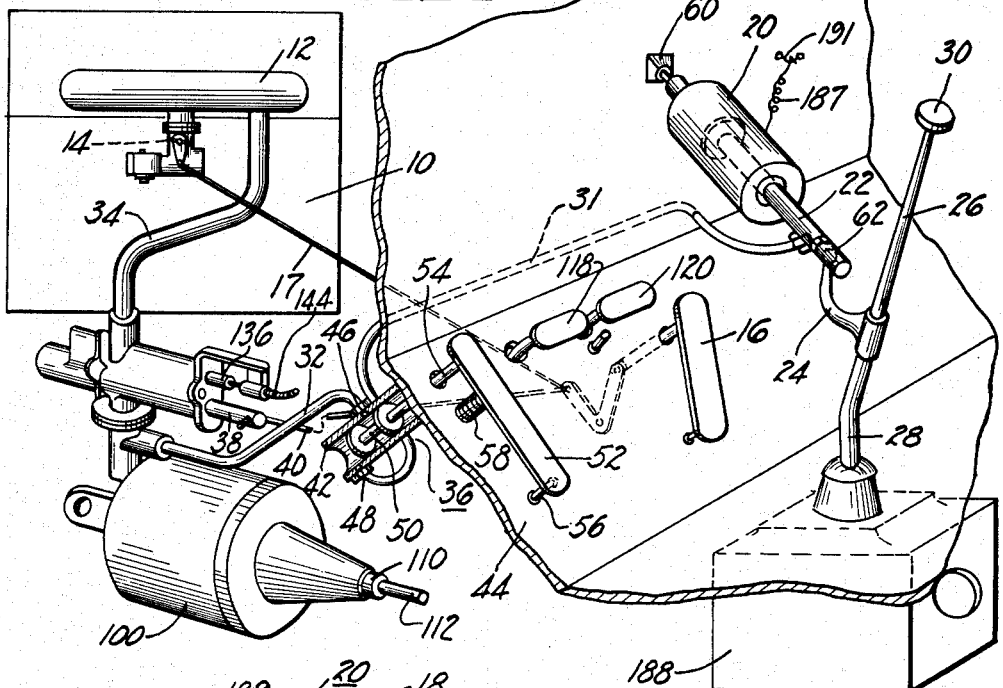
FIG.1
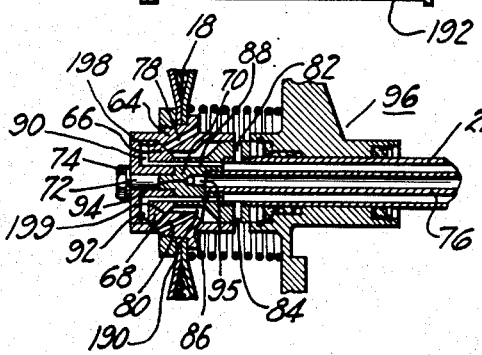
FIG.2
FIG.3
INVENTOR.
VICTOR W. KLIESRATH
ROBERT P. BREESE
BY H. O. Clayton
ATTORNEY.

April 28, 1942. V. W. KLIESRATH ET AL 2,281,159
TRANSMISSION OPERATING MECHANISM
Filed Oct. 24, 1939 4 Sheets-Sheet 2
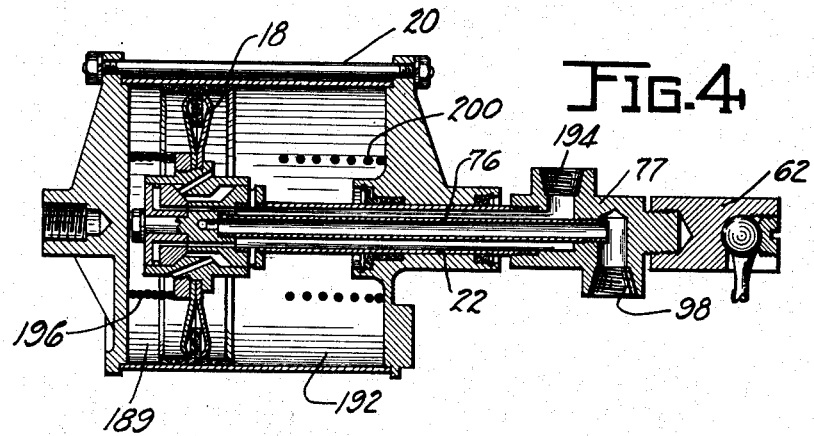
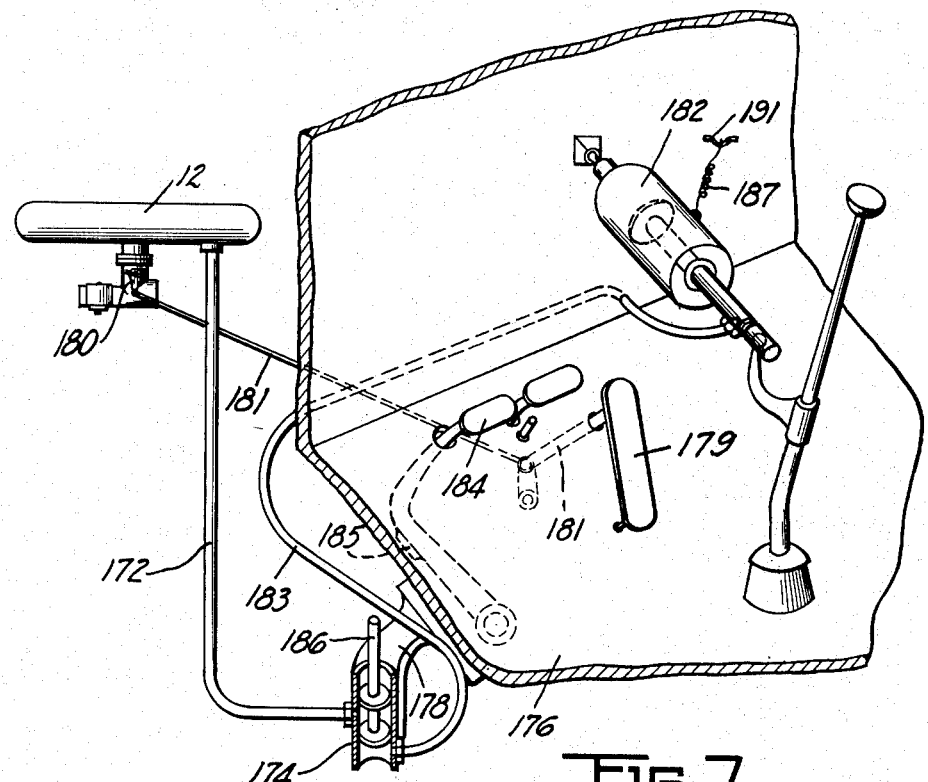
INVENTOR.
VICTOR W. KLIESRATH
BY ROBERT P. BREESE
H. O. Clayton
ATTORNEY.

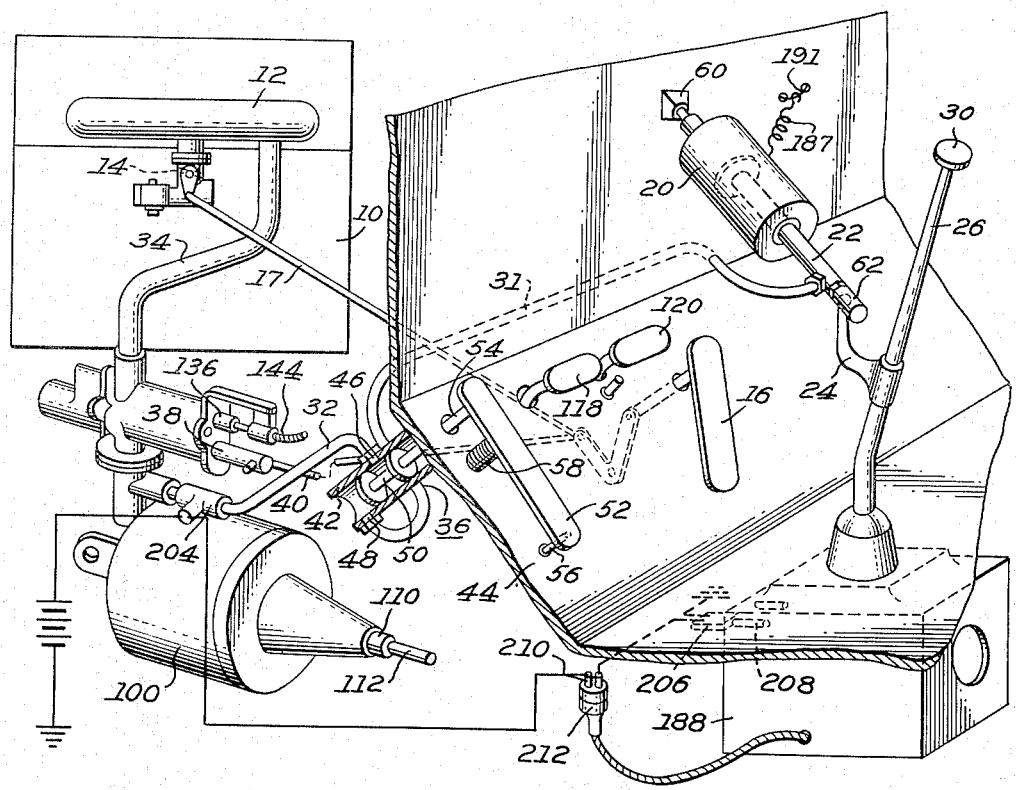

Patented Apr. 28, 1942

2,281,159

UNITED STATES PATENT OFFICE 2,281,159

TRANSMISSION OPERATING MECHANISM

Victor W. Kliesrath and Robert P. Breese, New York, N. Y., assignors to Bendix Aviation Corporation, South Bend, Ind., a corporation of Delaware Application October 24, 1939, Serial No. 301,056

7 Claims. (Cl. 192—.01)

This invention relates to mechanism for operating the three-speeds forward and reverse change-speed transmission of an automotive vehicle.

With respect to the power operation of the transmission of an automotive vehicle, the prior art is replete with suggestions of so-called built-in mechanisms for operating the gear train of the transmission. However, such mechanisms are necessarily complicated and expensive, usually requiring a modification of the standard form of transmission and including numerous conduits, valves, cylinders, etc.

This invention is accordingly specifically directed to a very simple and economical form of manually and power operated accessory unit adapted to operate the present-day type of transmission including a low and reverse gear shift rail and a second and high gear shift rail.

The most important object of the invention is to provide a transmission operating mechanism which may be operated by the physical effort of the driver to place the transmission either in neutral or in gear and by power means, controlled in part by the foot of the driver, for alternately placing the transmission in second gear and in high gear when it is not manually operated. It is a further object of the invention to so construct said mechanism that after the transmission has been manually placed in low gear the next operation of the mechanism, effected by the power means, will place the transmission in second gear.

A further object of the invention is to provide a transmission operating mechanism including power means, preferably a spring, a pressure differential operated motor, valve mechanism for controlling the operation of said motor, a hand operated member and force-transmitting means interconnecting the power element of the motor, the hand operated member and that portion of the transmission operating mechanism for first selecting a shift rail to be operated and then moving said rail, the parts of said mechanism being so constructed and arranged as to make possible, first, a setting of the transmission in low gear by the physical effort of the driver and then a setting of the transmission in second gear by the operation of said motor and spring.

A further object of the invention is to provide, in a transmission operating mechanism, means, preferably a spring, operable after the accelerator is depressed to actuate a part of said mechanism to thereby prepare for or preselect a subsequent gear setting operation of said mechanism.

Yet another object of the invention is to provide a transmission operating mechanism including a motor and power means, said means being automatically operated, when the low and reverse shift rail is being moved to place the transmission in low gear, to so actuate a part of said mechanism as to insure a second gear operation of the transmission operating mechanism when the same is next operated by the motor.

Yet another object of the invention is to provide a transmission operating mechanism including a power means, preferably a spring, and further including a pressure differential operated motor, said mechanism insuring a second gear operation of the transmission, after said mechanism has been actuated by the physical effort of the driver to place the transmission in low gear.

Yet another object of the invention is to provide a power operated mechanism controlled in part by a foot operated member for alternately placing a three-speeds forward and reverse automotive transmission in high and in second gear, together with a hand operated member cooperating with and constituting a part of said power operated mechanism to provide a mechanism for placing the transmission either in low gear or in reverse gear by the physical effort of the driver and either in second gear or in high gear by the physical effort of the driver in the event of failure of the power means.

The invention further contemplates the provision of transmission operating means including a pressure differential operated motor operable, after release of the accelerator and depression of a manually operated control member, to place the transmission in second gear after said means is manually operated to place the transmission in low gear to start the vehicle. A further object of the invention is to so construct said means that, after the transmission has been placed in second gear, upon release of the accelerator and depression of a manually operated control member the transmission will be placed in high gear, and thereafter the transmission will be placed alternately in second gear and in high gear upon release of the accelerator and depression of said control member.

A further object of the invention is to provide mechanism for actuating a three-speeds forward and reverse transmission, said means including a pressure differential operated motor, separate hand and foot operated control members and force-transmitting means interconnecting the transmission, motor and one of said control members, the parts of the mechanism being so constructed and arranged as to make possible either a complete manual operation of the transmission or the movement of one or the other of the shift rails of the transmission either by the power means or by the power means aided by the physical effort of the driver.

Yet another object of the invention is to provide a transmission operating mechanism including a power means, preferably a spring, and a pressure differential operated motor controlled in part by preselector means automatically operable, after the transmission is placed in second gear and the accelerator is depressed to lower the gaseous pressure within the intake manifold, to prepare for a high gear operation of the motor.

Other objects of the invention and desirable details of construction and combinations of parts will become apparent from the following detailed description of certain embodiments of the invention, taken in conjunction with the accompanying drawings illustrating said embodiments, in which:

Figure 1 is a diagrammatic view disclosing the principal elements of the transmission operating mechanism constituting our invention;

Figure 2 is a longitudinal sectional view of the transmission operating motor disclosed in Figure 1, the power element and the relay control valve of said motor being disclosed in full lines in their high gear positions and in dotted lines in the preselected position of the valve for effecting a high gear operation of the motor;

Figure 3 is a view disclosing, in section, the relay valve mechanism for controlling the operation of the transmission operating motor, said mechanism being in its preselected position to effect a second gear operation of the motor;

Figure 4 is another longitudinal sectional view of the transmission operating motor, the power element thereof and the relay control valve being shown in the positions they assume when the transmission is in second gear;

Figure 7 is a view, similar to Figure 1, disclosing another embodiment of the transmission operating mechanism constituting our invention; and Figure 8 is a view disclosing the mechanism of Figure 1 together with electrically controlled cut-out means for the transmission operating mechanism.

Figure 6:
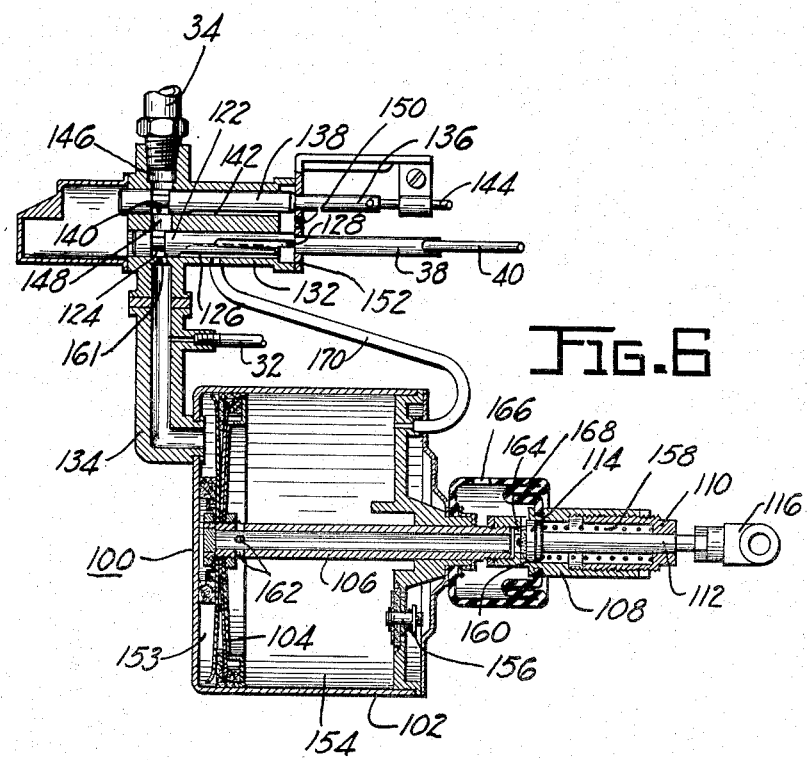
Figure 6 is a sectional view of the clutch operating mechanism disclosed in Figure 1.

In that embodiment of the invention selected for illustration and disclosed diagrammatically in Figure 1, there is provided a conventional internal-combustion engine 10 having an intake manifold 12 and a throttle 14 actuated by an accelerator 16, the latter being connected to the throttle by linkage 17. Other parts of the power plant of the vehicle, including the clutch, the three-speeds forward and reverse transmission, the drive shaft and the differential, are not disclosed, inasmuch as they are of conventional design and of themselves constitute no part of our invention. The transmission includes a low and reverse gear shift rail, a second and high gear shift rail and means for selecting a shift rail to be actuated and for moving said rail to establish the transmission in gear.

The piston 18 or power element of a double-acting vacuum operated motor 20 is operably connected to force-transmitting means including a connecting rod 22, a link 24, a member 26 and a member 28, the latter being connected to the aforementioned rail selecting and rail moving means. To the upper end of the member 26 there is secured a knob 30, which is grasped by the hand of the driver. Accordingly, the piston, the manually operated member 30 and the means for selecting and for moving one or the other of the shift rails are interconnected by said force-transmitting means, the parts being so constructed and arranged as to make possible a complete manual operation of the transmission or a power operation thereof, which will be described in detail hereinafter.

The motor 20 may be placed in air-transmitting connection with the intake manifold 12 by conduits 31, 32 and 34, a manually operated two-way valve 36 and a three-way valve 38 operatively connected to the accelerator 16 by a link 40, diagrammatically disclosed. The valve 36 includes a cylindrical casing member 42, which is preferably secured to the floorboard 44. The member 42 is ported at 46 and 48, and a spool-shaped valve member 50, reciprocable within the casing member 42, is actuated by a foot operated treadle or control member 52 secured thereto by a rod 54. The treadle member 52 is preferably pivotally mounted upon a pin 56 and is returned to its off position by a spring 58. The motor 20 is pivotally secured to the dash at 60, and the connecting rod 22 is universally connected to the link 24 by a ball and socket connection 62.

A hub portion 64 of the piston, constituting a valve member, is slidably mounted on a two-part valve member 66 comprising members 68 and 70 secured together by a projection 72 extending from the member 70 through the member 68 and secured to the latter by a nut 74. The member 70 is threadedly mounted on the end of the connecting rod 22, and a tube 76, extending through the connecting rod, is threadedly secured at one of its ends to the end of the member 70 and at its other end to a fitting 77 mounted on the end of said rod. Valve members 64, 68 and 70 are provided with cooperating ducts 78, 80, 82, 84, 86, 88, 90, 92, 94 and 95, referred to hereinafter in describing the operation of the valve. The two-part valve member 66 and the valve member 64 constitute a control valve for the motor, said valve as a whole being indicated by the reference numeral 96. The conduit 31 interconnects a vacuum port 98 in the fitting 77 with the foot operated control valve 36, the latter being connected by the conduit 32 with the accelerator operated three-way valve 38. The latter valve controls the connection between the conduit 32 and the conduit 34 leading to the source of power, namely, the intake manifold 12, and also controls the connection between the manifold and a vacuum operated motor 100, which is operable when the accelerator is released to effect a disengagement of the clutch. The motor may, of course, be mounted adjacent the transmission.

The clutch must be disengaged before the transmission can be operated. Accordingly, when the accelerator is released, to close the throttle 14 preparatory to operating the transmission, the motor 100 is energized to effect a disengagement of the clutch. However, no claim is made to the mechanism herein disclosed for operating the clutch, inasmuch as such mechanism and the mechanism disclosed herein cooperating therewith for operating the transmission are claimed in Kliesrath Patent No. 2,134,520 dated October 25, 1938, and in our Patent No. 2,177,662 dated October 31, 1939, the instant application constituting a continuation-in-part of said last-mentioned patent.

The clutch operating motor 100 and its three-way control valve 38 are disclosed in detail in Figure 6, the motor comprising a cylinder 102 housing a piston or so-called power element 104. The latter element is connected to the clutch by means including a hollow connecting rod 106, a hollow rod 108 threadedly connected to the rod 106, a sleeve 110 threadedly connected to the rod 108, a rod 112 upon one end of which is mounted a valve member 114, and a fitting 116 to which is connected linkage, not shown, connected to the clutch. The rod 112 is slidable within the end of the sleeve 110 for a purpose to be described hereinafter.

The clutch may also be disengaged by a foot operated clutch pedal 118 extending within the driver's compartment next to a brake pedal 120. The three-way valve 38 consists of a plunger 122 having a recess 124, a slot 126 and a tapered slot 128 therein and being connected to the accelerator 16 by the link 40. This plunger is reciprocable within a cylindrically-shaped opening in a valve casing 132. This casing is secured to the cylinder 102 by a conduit 134, the motor and valve mechanism as a unit being fixedly secured to any convenient part of the chassis of the vehicle or to the engine. The motor controlling valve mechanism also includes a three-way cut-out valve 136 consisting of a plunger 138 reciprocable within a cylindrically-shaped opening in the body of the valve casing 132. This plunger is recessed at 140, is provided with a slot 142, and is connected to a cable 144 constituting part of a Bowden wire control, preferably extending to the dashboard of the driver's compartment.

Describing the operation of the motor 100 and control valves 38 and 136, the Bowden wire control is operated by the driver, thereby tensioning the cable 144 and drawing the valve plunger 138 to the right to the position disclosed in Figure 6. In this position, the recess 140 in the plunger 138 registers with ports 146 and 148 in the valve casing 132, thereby placing the recess 124 in the valve plunger 122 in fluid-transmitting connection with the intake manifold 12. However, should the driver wish to cut out the operation of both the clutch operating motor 100 and the transmission operating motor 20, the aforementioned Bowden control is operated to force the valve plunger 138 to the left to cut off the connection with the manifold and vent the motor 100 and the port 46 in the valve 36 to the atmosphere. The port 148 is then connected to the atmosphere via the slot 142 in the valve plunger 138 and an opening 150 in a plate 152 covering the end of the valve casing 132. The accelerator is at this time released to move the valve plunger 122 to the position disclosed in Figure 6 to make possible the aforementioned venting of the motor 100 and of the valve port 46. Inasmuch as the port 146 of the valve 36 is vented to the atmosphere, said valve may not be operated to effect an energization of the transmission operating motor 20.

Describing the clutch disengaging operation of the motor 100, the valves 38 and 136 are placed in the positions disclosed in Figure 6. A compartment 153 of the motor 100 is then partially evacuated, for it is connected to the intake manifold, and the manifold is partially evacuated by virtue of the pumping action of the engine pistons when the engine is idling. The piston 104 is then drawn to the left to disengage the clutch, for atmosphere entering a compartment 154 of the motor 100 via a check valve 156, together with the low gaseous pressure within the compartment 153, results in the piston 104 being subjected to a differential of pressures. When the piston moves to the left, a spring 158, weaker than the clutch springs, is compressed, thereby moving the valve 114 away from a seat 160 without, however, moving the rod 112 to disengage the clutch, for said rod is slidable within the sleeve 120. After the spring 158 goes solid, continued leftward movement of the piston 104 results in the movement of the rod 112 to effect a disengagement of the clutch. As disclosed in Figure 6, the conduit 134 leading to the clutch motor 100 is larger than the conduit 32, and this construction makes possible an evacuation of the compartment 153 to effect a disengagement of the clutch before the motor 20 may be energized to effect an operation of the transmission.

The clutch having been disengaged, the transmission is placed in gear by first grasping the member 30 and moving the same and the transmission operating linkage 26 and 28 connected thereto. The driver usually places the transmission in first gear to start the car, however, any one of the gear ratios of the transmission may be established, for it will be remembered that at this time the treadle 52 is released to de-energize the motor 20. The driver then depresses the accelerator to engage the clutch and to open the throttle to speed up the vehicle. Describing the clutch engaging operation of the motor 100, movement of the three-way valve plunger 122 to the left, by depressing the accelerator, moves the recessed portion 124 of the plunger out of registry with the port 148 and moves the slot 126 into registry with a port 161. The compartment 153 of the motor is then vented to the atmosphere via conduit 134, port 161, slot 126 and the port 150 in the end wall 152 of the valve casing. The piston 104 is then no longer subject to the aforementioned differential of pressures and the clutch springs immediately function to move the piston to the right. Now, it will be remembered that the spring 158 is weaker than the clutch springs; accordingly, said spring 158 remains compressed, thereby permitting air to leave the compartment 154 via ports 162 in the rod 106, a port 164 in the rod 108 and an opening 166 in a rubber boot 168. Air also flows from the compartment 154 to the atmosphere via a conduit 170 and the tapered slot 128, the conduit being connected to the valve casing 132 over a port in the casing, not shown, which port registers with the slot 128. The boot serves to cover the port 164 and the valve 114 and prevents the entrance of dirt into said port. When the clutch plates first contact, the pull of the clutch springs is decreased, resulting in the spring 158 expanding to seat the valve 114. Thereafter, the air from the compartment 154 flows through the conduit 170 and thence to the atmosphere via the tapered slot 128 and port 150. There are thus provided two stages of clutch engaging movement of the driven clutch plate, the first stage being relatively fast by virtue of the relatively high rate of efflux of air from the compartment 154 via the port 164 and the slot 128. After the clutch plates contact and the valve 114 seats, the rate of movement of the driven clutch plate is reduced, inasmuch as the air then passes from the compartment 154 at a relatively slow rate via the tapered slot 128.

There is thus provided power means for disengaging the clutch when the accelerator is released and before the transmission may be operated to establish it in gear: and after the desired gear ratio has been established, depression of the accelerator results in a smooth engagement of the clutch simulating a manual operation thereof.

The motor 100 and its control valve mechanism may be eliminated and the conduits 32 and 34 may be joined to provide but one conduit 172 interconnecting the manifold 12 and a valve 174, all as disclosed in Figure 7. The valve 174, which is secured to the floorboard 176 by a bracket 178, is of the same construction as the valve 36. The accelerator 179 is connected to the throttle 180 by linkage 181, and the valve 174 is connected to a pressure differential operated motor 182 by a conduit 183. The motor 182 and its connection with the transmission are of the same construction as the transmission operating motor and connections disclosed in Figure 1. The clutch operating motor being omitted, it is then necessary, of course, to manually depress a clutch pedal 184 to disengage the clutch, and, as disclosed in Figure 7, said pedal is provided with a projection 185 contactible with a valve operating rod 186 after the clutch is disengaged. Preferably the distance between the projection 185 and the rod 186 is such that the valve is opened only when the clutch pedal is moved to the limit of its throw. The driver may then depress the clutch pedal sufficiently to completely disengage the clutch and thus effect a coasting of the vehicle without operating the transmission to shift gears.

Figure 5:
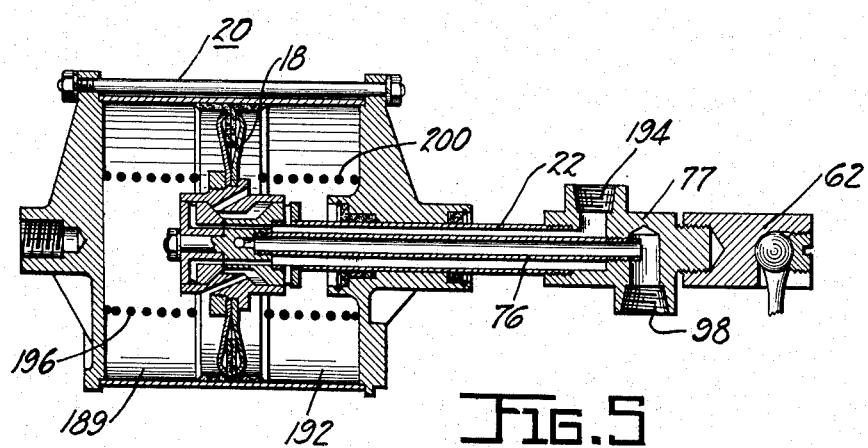
Figure 5 is yet another longitudinal sectional view of the transmission operating motor, the power element and the relay valve being shown in their transmission neutral positions.

Describing now the operation of the transmission operating mechanism constituting our invention, and incidentally completing the detailed description thereof, the driver of the vehicle, assuming that he desires to place the transmission in low gear, first moves the member 28 to its transmission neutral position. Figure 5 discloses the relative positions of the parts of the motor and valve mechanism 96 when the transmission is in this position. The accelerator is at the time released to open the valve 38 and the clutch is accordingly disengaged by the motor 100. The knob 30 is then moved laterally to the left, against the tension of a spring 187, and then is moved toward the driver to place the transmission in low gear. This leftward movement serves to actuate the shift rail selecting mechanism enclosed within a transmission casing 188 to prepare for a subsequent actuation of the low and reverse shift rail, and when said rail has been moved to establish low gear the valve member 68 contacts the valve member 64. The valve parts are then in the position disclosed in Figure 3. The spring 187, preferably secured to the dashboard at 191 and to the casing of the motor 100, constitutes a power means operative to bias said motor and the force-transmitting means connected thereto to a position to effect a selection of the second and high gear shift rail. Accordingly, this spring must be stretched when the knob 30 is moved to effect what is known as the cross-shift operation of the transmission.

The transmission having been placed in low gear by the physical effort of the driver, the driver then depresses the accelerator to open the throttle and close the valve 38, thereby effecting a clutch engaging operation of the motor 100. When the desired vehicle speed is reached, the driver then releases the accelerator and depresses the treadle member 52 with his foot, thereby opening the valves 38 and 36. The clutch is then again disengaged by the motor 100. Depression of the treadle 52 moves the spool-shaped valve member 50 downwardly to interconnect valve port 46 with the port 48 to thereby interconnect the port 98 in the fitting 77 with the intake manifold via conduit 34, valve 38, conduit 32, valve 36 and conduit 31. A compartment 189 of the motor 20 is at the time connected with the port 98 via the duct 80 in the valve member 64, a compartment 190 outlined by the valve member 64 and the outer surface of the valve members 68 and 70, ducts 94 and 95 in the valve member 70 and the tube 76 within the connecting rod. Air, at atmospheric pressure, enters a compartment 192 of the motor 20 via a port 194 in the fitting 77, the interior of the rod 22 and ducts 82 and 84 in the end of the valve member 70. The gaseous pressures of the compartments 192 and 189 being different, that of compartment 192 being greater than that of compartment 189, the piston 18 is then subjected to a differential of pressures, resulting in a movement of the same to the left, Figure 2, to place the transmission in second gear. It is assumed, of course, that the driver removes his hand from the knob 30 during this operation, thus permitting the spring power means 187 to effect a cross-shift movement of the aforementioned force-transmitting means and an operation of the shift rail selecting mechanism connected thereto, when the motor piston 18 reaches its transmission neutral position. Accordingly, there is provided a power means, including the motor 20 and the spring 187, serving to operate the transmission operating mechanism to place the transmission in second gear, after said mechanism has been operated by the physical effort of the driver to place the transmission in low gear. When the transmission is in second gear and prior to closing the valve 36, the parts of the valve mechanism 96 are in the position disclosed in Figure 4, leftward movement of piston 18 and the valve 96 serving to compress a spring 196 when the cone-shaped face 198 of valve member 64 contacts a corresponding cone-shaped face 199 of the valve member 68.

Second gear having been established, the driver then releases the treadle 52, thereby moving the valve member 50 of valve 36 to the position disclosed in Figure 1. In this position, the port 48 is connected to the atmosphere, resulting in admitting air to the then partially evacuated motor compartment 189. The valve operating spring 196 then expands, moving the valve member 64 and the piston 18 connected thereto from the second gear position of the parts disclosed in Figure 4 to the position disclosed in dotted lines in Figure 2. The motor controlling valve 96 may thus be defined as a relay valve, which is automatically actuated by the spring 196 as a power means, when the manually operated two-way valve 36 is closed, that is, when the treadle 52 is released. The latter valve may thus be termed a master or pilot valve, which, together with the spring 196 and a spring 200, described hereinafter, controls the operation of the relay valve 96. As more completely described hereinafter, should the valve 36 be held open, the throttle 14, actuated by the accelerator, becomes a pilot valve to control the relay valve 96. The spring 196 serves as a preselector means, for when it expands to move the valve member 64 to the position disclosed in dotted lines in Figure 2, the relay valve 96 is then operative, when the treadle 52 is again depressed, to effect either a high gear or a low gear operation of the motor 20, depending of course upon the position, at that time, of the shift rail selecting mechanism within the transmission casing.

After the treadle 52 is released, the driver then depresses the accelerator to effect an engagement of the clutch as previously described and to open the throttle to speed up the vehicle. Asssuming that a high gear setting of the transmission is now desired, the driver then releases the accelerator to close the throttle to effect a partial evacuation of the intake manifold and, incidentally, to effect a disengagement of the clutch. The manually operated treadle member 52 is then again depressed to open the valve 36, which immediately results in a partial evacuation of the motor compartment 102. The air passes from this compartment via duct 78, compartment 190, ducts 94 and 95 and tube 76. Air is at the time admitted to motor compartment 189 via port 194, the interior of connecting rod 22 and ducts 86, 88, 90 and 92. The piston 18 is accordingly again subjected to a differential of pressures, resulting in its movement to the right, Figure 2, the force-transmitting connections and the shift rail moving mechanism, including the member 28, being then actuated to place the transmission in high gear. The valve parts then take the position disclosed in full lines in Figure 2. The transmission having been established in high gear, the treadle 52 is released, thereby closing the valve 36. This operation, as previously described, will effect a venting of the motor compartment 102, resulting in an immediate expansion of the spring 200 to preselect the valve 96 for a second gear operation of the motor, the valve parts assuming the position disclosed in Figure 3.

There is thus provided means for effecting a shift from high gear to second gear and back again by merely depressing the treadle 52 of the mechanism of Figure 1 or the clutch pedal 184 of the mechanism disclosed in Figure 7. When the vehicle is stopped, the transmission is then established in one or the other of these gear ratios, and if the vehicle is equipped with both a fluid clutch and a spring operated plate clutch it will be unnecessary to disengage the latter clutch. Preferably, however, the transmission should be established either in second gear or in low gear in starting the vehicle, even if the vehicle is equipped with a fluid clutch.

Accordingly, a solenoid operated three-way valve 204 may be incorporated either in conduit 32 or in conduit 34 to cut off the connection with the manifold and vent the conduit to the atmosphere when the vehicle is at a standstill or is traveling at or below a relatively low speed and the transmission is established in second gear. The solenoid may be controlled by a switch 206 operated by the second and high gear shift rail 208 and by a switch 210 operated by a propeller shaft operated governor 212, said switches being connected with the solenoid in series so that both switches must be closed to energize the solenoid. With such a mechanism, the valve 36 is rendered inoperative to effect a high gear operation of the motor 100 when the vehicle is stopped or is traveling very slowly and the transmission is in second gear.

It will also be noted that with the mechanism of our invention the driver is at all times advised of the then existing setting of the transmission, for the driver has but to glance at the knob 30 to determine its position. If desired, the driver may at any time elect to operate the transmission by manually operating the member 28, the motor and the mechanism housed therein being constructed to make this possible; for in this event the motor swivels upon the pivot 60 and the piston 18 and the valve 96 move back and forth as the knob 30 is being moved.

As stated supra, the valves 38 and 136 and the clutch operating motor 100 may be eliminated and the conduits 32 and 34 joined to provide but one conduit interconnecting the manifold and the valve 36. The accelerator operated throttle and the valve 36 then become controls for initiating an operation of the power means for actuating the transmission operating mechanism. Furthermore, the clutch pedal operated cut-in valve 36 may be omitted, thus making of the accelerator a control member cooperating with the power operated relay valve 96 for preselecting the operations of the motor 20; for, after the transmission has been placed in gear, the accelerator is then depressed, thus increasing the gaseous pressure within the intake manifold and permitting one or the other of the springs 196 and 200 to operate the valve 96.

In starting the vehicle, should the driver desire to place the transmission in low gear or in reverse gear, he may do so by first manually moving the member 28 to the left to select the low and reverse gear shift rail of the transmission and then manually moving said member and the rail connected thereto in the direction to establish the desired gear ratio.

There is thus provided a simple and efficient transmission operating mechanism for operating a standard type of transmission, said mechanism including two foot operated members, the accelerator, a treadle or the clutch pedal and a hand operated member. The driver of the vehicle may elect to completely operate the transmission manually or, with the exception of the cross-shift operation of selecting the low and reverse gear shift rail, he may operate the transmission by the power means, and as the power means is operating to move the shift rail the driver may aid said means by a manual operation of the knob 30. After the transmission has been placed in low gear by the physical effort of the driver, it is thereafter placed in second gear and then in high gear upon release of the accelerator and depression of the remaining foot operated control member, that is, either the treadle 52, disclosed in Figure 1, or the clutch pedal 184, disclosed in Figure 7.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In an automotive vehicle provided with a change-speed transmission having a plurality of shift rails, manually and power actuated means for operating the transmission including a hand actuated member, a double-acting pressure differential operated motor, means for controlling the operation of said motor including a valve mechanism housed within said motor and a control unit located exteriorly of said motor, and force-transmitting means interconnecting said hand actuated member, the power element of said motor and the transmission, all of said parts being so constructed and arranged as to make possible movement of the selected shift rail by the physical effort of the driver to establish the transmission in a desired gear ratio, or movement of said rail by said motor, or movement of said rail by the combined physical effort of the driver and the power of said motor.

2. In an automotive vehicle provided with a change-speed transmission having a plurality of shift rails and means for selecting a rail and moving the selected rail to place the transmission in any one of its low, reverse, second or high gear settings, manually and power actuated means for operating the transmission including a manually actuated member, force transmitting means interconnecting said member with the aforementioned means, a pressure differential operated motor comprising a casing and a power element therein, a plurality of control units for controlling the operation of said motor one of said units being a power operated valve mechanism, said mechanism together with the motor constituting a single unit, springs for in part operating said valve mechanism, and force-transmitting means interconnecting the power element of said motor and the shift rail selecting and moving means, all of said parts being so constructed and arranged as to make possible a movement of one of said shift rails by the physical effort of the driver to thereby establish the transmission in either low gear, or reverse gear, or a movement of another rail by said motor to establish the transmission in either second gear or high gear.

3. In an automotive vehicle provided with a three-speeds forward and reverse transmission having a low and reverse gear shift rail and a second and high gear shift rail, means for operating the transmission comprising a pressure differential operated motor having its power element connected to the shift rail operating mechanism of the transmission, a foot operated member and a hand operated member, means for controlling the operation of said motor to effect a power operation of the second and high gear shift rail of the transmission, said means including a control unit housed within said motor and a control unit operated by said foot operated member, and force-transmitting means interconnecting the power element of said motor and said hand operated member and constructed and arranged to make possible a manual operation of the transmission to effect a movement of the low and reverse gear shift rail thereof.

4. In an automotive vehicle provided with an accelerator and a change-speed transmission including a plurality of shift rails, and further including means operable to select a rail to be operated and to move the selected rail to place the transmission in gear, mechanism for actuating said rail selecting and rail moving means including a hand operated member which may be so moved as to effect a low gear setting of the transmission, and further including a pressure differential operated motor, valve means for controlling the operation of said motor, and means controlled in part by the accelerator and including a preselector means for so controlling the operation of said valve means as to effect a second gear operation of the motor when the transmission is next operated after placing the same in low gear and to then effect a high gear operation of the motor when the latter is next operated.

5. In an automotive vehicle provided with a change-speed transmission having a low and reverse gear shift rail, a high and second gear shift rail and force-transmitting means for first selecting a rail to be operated and then moving said rail to establish the transmission in the desired gear ratio, power means for so actuating said rail selecting and moving means as to effect its rail moving operation, said power means including a pressure differential operated motor and means for controlling the operation of said motor including a cut-off valve, and means for controlling the operation of said valve including a vehicle speed-responsive governor and means operated by the second and high gear shift rail when said rail is in its second gear position.

6. In an automotive vehicle provided with a change-speed transmission, means for operating the transmission comprising power means and manually actuated means including a hand operated member biased by yieldable means to a position preparatory to effecting a second or high gear ratio setting of the transmission, said power means including a double-acting pressure differential operated motor, means for controlling the operation of said motor including a power operated valve mechanism associated with said motor and further including a valve controlling unit located exteriorly of said motor, and force transmitting means interconnecting said hand operated member and transmission, all of said parts being so constructed and arranged as to effect a gear selecting operation of the transmission when the hand operated member is moved in one direction and to effect one or the other of two settings of the transmission by the physical effort of the driver when the hand operated member is moved in one or the other of two other directions and also to effect a power operation of the transmission to effect one or the other of two other settings of the transmission when the hand operated member is moved to a certain position and the valve mechanism is operated.

7. In an automotive vehicle provided with a change-speed transmission, means for operating the transmission comprising a hand operated member and a double-acting motor, valve mechanism incorporated in the motor for securing the operation thereof, means located remotely from said motor for so controlling the operation of said valve mechanism as to alternately effect two gear establishing operations of the transmission by said motor, force transmitting means for effecting a selecting operation of the transmission and a gear establishing operation thereof, manually operated means including said hand operated member for moving said force transmitting means to effect first said selecting operation of the transmission and then to effect a gear establishing operation of the transmission, and force transmitting means interconnecting the motor with said force transmitting means.

VICTOR W. KLIESRATH.
ROBERT P. BREESE.